United States Patent
Watanabe

(10) Patent No.: US 9,500,781 B2
(45) Date of Patent: Nov. 22, 2016

(54) OPTICAL SYSTEM AND LASER PROCESSING APPARATUS

(71) Applicant: MITSUBISHI HEAVY INDUSTRIES, LTD., Tokyo (JP)

(72) Inventor: Masao Watanabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 160 days.

(21) Appl. No.: 13/960,982

(22) Filed: Aug. 7, 2013

(65) Prior Publication Data
US 2014/0097161 A1    Apr. 10, 2014

(30) Foreign Application Priority Data

Oct. 5, 2012    (JP) ................................. 2012-223485

(51) Int. Cl.
| | |
|---|---|
| B23K 26/00 | (2014.01) |
| G02B 3/00 | (2006.01) |
| B23K 26/06 | (2014.01) |
| B23K 26/20 | (2014.01) |
| B23K 26/38 | (2014.01) |
| G02B 27/09 | (2006.01) |
| H01S 3/00 | (2006.01) |

(52) U.S. Cl.
CPC .......... G02B 3/0087 (2013.01); B23K 26/0648 (2013.01); B23K 26/20 (2013.01); B23K 26/38 (2013.01); G02B 27/095 (2013.01); G02B 27/0927 (2013.01); H01S 3/005 (2013.01)

(58) Field of Classification Search
CPC ... B23K 26/0648; B23K 26/38; B23K 26/20

USPC ............ 219/121.65, 121.63, 121.68, 121.74, 219/121.77, 121.82, 121.6, 129, 121.73
See application file for complete search history.

(56) References Cited

U.S. PATENT DOCUMENTS 3,852,684 A * 12/1974 Roess et al. .................... 372/19
5,013,928 A *  5/1991 Ikeda et al. .................. 250/574
(Continued)

FOREIGN PATENT DOCUMENTS

| | | |
|---|---|---|
| DE | 102 15 446 | 11/2003 |
| FR | 2 755 252 | 4/1998 |
| JP | 1-143783 | 6/1989 |

(Continued)

OTHER PUBLICATIONS

Extended European Search Report issued Feb. 28, 2014 in corresponding European patent application No. 13 17 9383.

(Continued)

Primary Examiner — Phuong Nguyen
(74) Attorney, Agent, or Firm — Wenderoth, Lind & Ponack, L.L.P.

(57) ABSTRACT

An optical system and a laser processing apparatus with which spattering can be suppressed by reducing an evaporation reactive force at a workpiece by forming two focal points on the optical axis, using a simple configuration. The optical system is provided with a convex lens that focuses laser light; and a concave lens that is disposed on the same optical axis as the laser light that passes through the convex lens. The concave lens has a first region that has a through-hole, that is positioned on the optical axis, and that does not have lens properties, as well as a second region that surrounds the first region and that diverges the laser light.

2 Claims, 8 Drawing Sheets

(56) References Cited

U.S. PATENT DOCUMENTS

2003/0081276 A1* 5/2003 Tseng .............................. 358/538
2009/0294412 A1* 12/2009 Kono ......................... 219/121.6

FOREIGN PATENT DOCUMENTS

| | | |
|---|---|---|
| JP | 2000-210785 | 8/2000 |
| JP | 2002-321078 | 11/2002 |
| JP | 2003-340582 | 12/2003 |
| JP | 2006-192503 | 7/2006 |
| JP | 2006-192504 | 7/2006 |
| JP | 2006-229075 | 8/2006 |

OTHER PUBLICATIONS

Office Action issued Aug. 26, 2014 in corresponding Japanese patent application No. 2012-223485 (with English translation).

* cited by examiner

OPTICAL SYSTEM AND LASER PROCESSING APPARATUS

CROSS-REFERENCE TO RELATED APPLICATIONS

This application is based on Japanese Patent Application No. 2012-223485, the contents of which are incorporated herein by reference.

BACKGROUND OF THE INVENTION

1. Technical Field

The present invention relates to an optical system through which laser light passes and to a laser processing apparatus.

2. Description of the Related Art

With a laser processing apparatus, laser light is transmitted to a processing head from a laser oscillator via an optical fiber, and the laser light is focused by lenses in the processing head to increase the energy density of the laser light, thereby welding or cutting a workpiece. Here, the workpiece is a metal, an alloy, or the like. Examples of the laser oscillator include a $CO_2$ laser oscillator in which $CO_2$ is used as a medium, a YAG laser oscillator in which a crystal having a garnet structure formed of oxides of yttrium and aluminum is used as a medium, a fiber laser oscillator in which an optical fiber itself is used as a medium, and so forth.

Japanese Unexamined Patent Application, Publication No. 2006-192503 discloses an invention related to a laser cutting method, which is a technique for cutting a metal workpiece having a thickness of 5 mm or less by using a bifocal lens that focuses laser beams at two locations, thus having a focal distance between 80 mm and 135 mm.

SUMMARY OF THE INVENTION

1. Technical Problem

In the case of a fiber laser, the laser light has a wavelength of 1.07 μm to 1.08 μm, and in the case of a YAG laser, the laser light has a wavelength of 1.06 μm. When welding a workpiece by using a laser processing apparatus, with the fiber laser and the YAG laser, the fraction absorbed by a material is increased as compared with a $CO_2$ laser (wavelength: 10.6 μm), and, in the case of iron in particular, it is 16-times higher or more.

As shown in FIG. 11, when a metal melts and evaporates during welding, the surface of the melted metal becomes depressed due to a reaction force of the vapor (evaporation reactive force) that is generated outward. Because the evaporation reactive force is increased when a fiber laser, YAG laser, or the like is used, a large amount of spattering occurs. When a large amount of spattering occurs, problems such as thinning of the welding bead occur, and, in the case of low-carbon steel or like, which has low liquid viscosity, breakage sometimes occurs after welding.

In order to cope with this, there is a method in which spattering is reduced by eliminating steepness in the laser profile by shifting (by defocusing) the focal point of laser light to a position away from a processing point. However, the high energy intensity originally possessed by the laser light cannot be fully utilized, thus, resulting in a lowered efficiency.

In addition, when a fiber laser, a YAG laser, or the like is used, the area of a welding spot created by the laser light is small. Because of this, when welding is performed by feeding a wire, it is difficult to control the insertion position of the wire, and thus, there is a problem in that it is not possible to achieve stable welding. Furthermore, an optical system for cutting and an optical system for welding use different beam forms when processing (when cutting or when welding). Because of this, it is difficult to share a single optical system between these two applications.

The present invention has been conceived in light of the above-described circumstances, and an object thereof is to provide an optical system and a laser processing apparatus with which spattering can be suppressed by reducing an evaporation reactive force at a workpiece by forming two focal points on the optical axis, using a simple configuration.

2. Solution to the Problem

An optical system according to the present invention is provided with a first lens that focuses laser light; and a second lens that is disposed on the same optical axis as the laser light that passes through the first lens. The second lens has a first region that is positioned on the optical axis and that does not have lens properties, as well as a second region that surrounds the first region and that diverges the laser light.

With this configuration, the first lens and the second lens are disposed on the same optical axis, and the laser light that passes through the first lens is focused. In addition, because the first region of the second lens, which is positioned on the optical axis, does not have lens properties, of the laser light that passes through the second lens, laser light that passes through the first region directly passes therethrough without being focused nor diverged. On the other hand, because the second region of the second lens, which surrounds the first region, diverges the laser light, of the laser light that passes through the second lens, laser light that passes through the second region diverges. Therefore, the light that has been focused by the first lens and that has also passed through the first region of the second lens exhibits a high energy intensity on the optical axis. On the other hand, because the light that has passed through the second region of the second lens diverges, the energy intensity thereof is lower as compared with the light that has passed through the first region. As a result, at the focal point of the laser light and in the vicinity thereof, a center portion including the optical axis has a high energy intensity, whereas a peripheral portion has a relatively low energy intensity.

In the above-described optical system, the first region may be a through-hole penetrating the second lens.

With this configuration, when forming the second lens, because it suffices to form an optical material in which the through-hole is provided into a concave shape and to subsequently polish it, the second lens can be formed in a simple manner.

In the above-described optical system, the first region may be a plate-like member in which a surface from which the laser light enters and a surface from which the laser light is emitted are parallel to each other.

With this configuration, the first region is a plate-like member whose two surfaces are parallel to each other and is not a through-hole; however, as with the case in which the through-hole is provided, at the focal point of the laser light and in the vicinity thereof, the center portion including the optical axis has a high energy intensity, whereas the peripheral portion has a low energy intensity.

In addition, a laser processing apparatus according to the present invention is provided with the above-described optical system and a laser oscillator that generates laser light and that emits the laser light toward the optical system.

With this configuration, a workpiece can be processed by using the laser light in which, at the processing point and in the vicinity thereof, the center portion including the optical axis has a high energy intensity, whereas the peripheral portion has a low energy intensity. For example, with laser light having a relatively short wavelength (a fiber laser or the like), the fraction absorbed by a material is high as compared with a $CO_2$ laser; therefore, when melted metal evaporates during welding, splashing (evaporation reactive force) may occur outward from the material, and thus, there is a risk of causing spattering. On the other hand, with the present invention, because the energy intensity is relatively low at the peripheral portion of the optical axis, the evaporation reactive force is reduced, and thus, spattering can be reduced or eliminated.

In addition, with this configuration, because the processing point is made relatively large, when welding while inserting a wire, it is not necessary to stringently control the insertion position of the wire. In other words, even if some allowance is given for the insertion position of the wire, it is possible to perform appropriate welding.

The above-described laser processing apparatus may be provided with a drive portion that moves the second lens out of the optical path of the laser light when cutting a workpiece and that places the second lens in the optical path of the laser light when welding the workpiece.

With this configuration, by moving the second lens out of the optical path of the laser light, the workpiece is cut by means of the laser light having a high energy intensity by using only the first lens, and, by placing the second lens in the optical path of the laser light, the first lens and the second lens are utilized, thus performing welding of the workpiece by means of the laser light in which the center portion including the optical axis has a high energy intensity, whereas the peripheral portion has a relatively low energy intensity. Therefore, the apparatus switches between cutting and welding of the workpiece by moving the second lens out of the optical path of the laser light and by placing it in the optical path. As a result, it is possible to quickly switch between cutting and welding, and thus, for example, it is possible to reduce the time required in a fabrication step in which cutting and welding of the workpiece are both required.

In addition, an optical system according to the present invention is provided with a third lens that diverges laser light; and a fourth lens that is disposed on the same optical axis as the laser light that passes through the third lens. The fourth lens has a third region that is positioned on the optical axis and that does not have lens properties, as well as a fourth region that surrounds the third region and that focuses the laser light.

With this configuration, the third lens and the fourth lens are disposed on the same optical axis, and the laser light that passes through the third lens diverges. In addition, because the third region of the fourth lens, which is positioned on the optical axis, does not have lens properties, of the laser light that passes through the fourth lens, laser light that passes through the third region directly passes therethrough without being focused nor diverged. On the other hand, because the fourth region of the fourth lens, which surrounds the third region, focuses the laser light, of the laser light that passes through the fourth lens, laser light that passes through the fourth region is focused. Therefore, the light that has been diverged by the third lens and that has also passed through the fourth region of the fourth lens exhibits a relatively high energy intensity on the optical axis. On the other hand, the light that has been diverges by the third lens and that has also passed through the third region of the fourth lens diverges without being focused.

3. Advantageous Effects of the Invention

With the present invention, spattering can be suppressed by reducing an evaporation reactive force at a workpiece by forming two focal points on the optical axis, using a simple configuration.

DETAILED DESCRIPTION OF THE INVENTION

Embodiments according to the present invention will be described below with reference to the drawings.

First Embodiment

Figure 1:
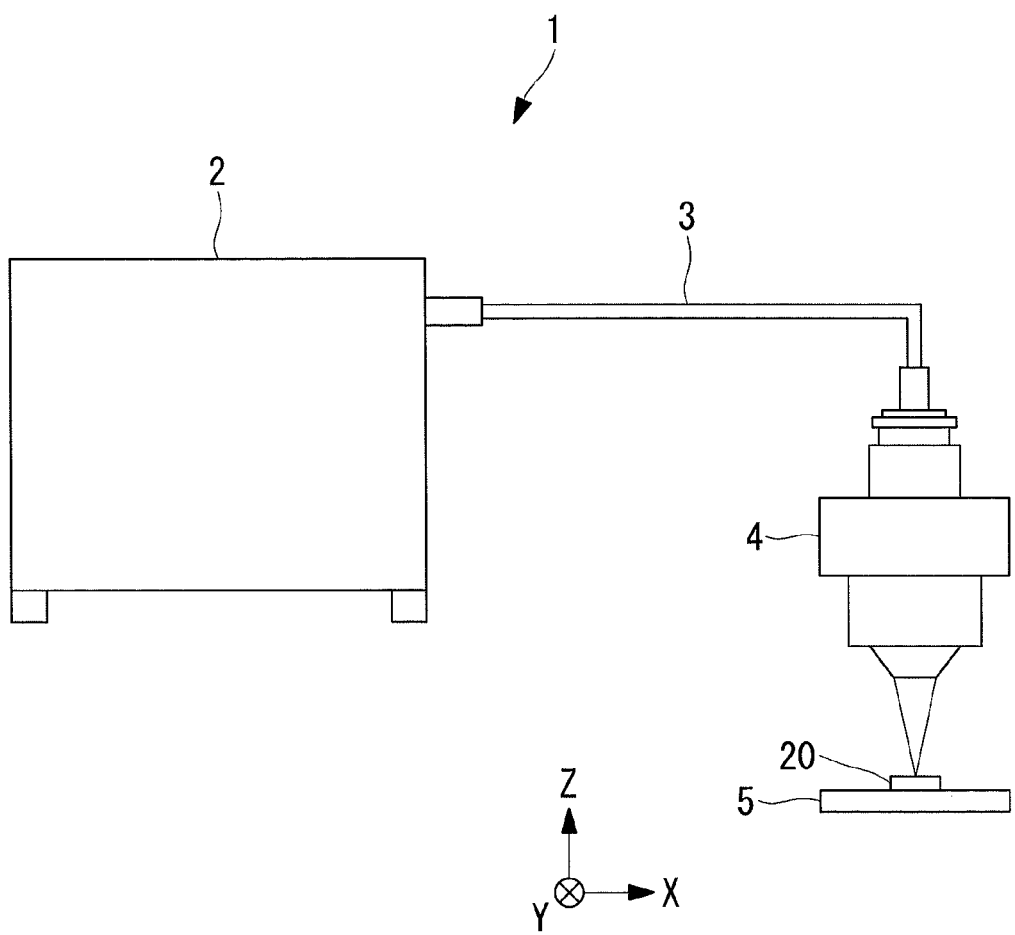
FIG. 1 is a diagram showing, in outline, the configuration of a laser processing apparatus according to a first embodiment of the present invention.

A laser processing apparatus 1 according to an embodiment of the present invention will be described below. As shown in FIG. 1, the laser processing apparatus 1 is provided with a laser oscillator 2, an optical fiber 3, a processing head 4, a processing stage 5, and so forth.

With the laser processing apparatus 1, laser light is transmitted to the processing head 4 from the laser oscillator 2 via the optical fiber 3, and the laser light is focused by lenses in the processing head 4 to increase the energy density of the laser light, thereby cutting a workpiece 20. Here, the workpiece 20 is a metal, an alloy, or the like.

The laser oscillator 2 is, for example, a fiber laser oscillator in which an optical fiber itself is used as a medium. In the case of a fiber laser oscillator, laser light having a wavelength of 1.07 μm to 1.08 μm can be obtained. The laser light generated by the laser oscillator 2 is transmitted to the optical fiber 3. Note that the present invention is not limited to the fiber laser, and it can be applied to a YAG laser, or the like.

The optical fiber 3 is connected to the laser oscillator 2 at one end and is connected to the processing head 4 at the other end. The optical fiber 3 transmits the laser light from the laser oscillator 2 to the processing head 4.

Figure 2:
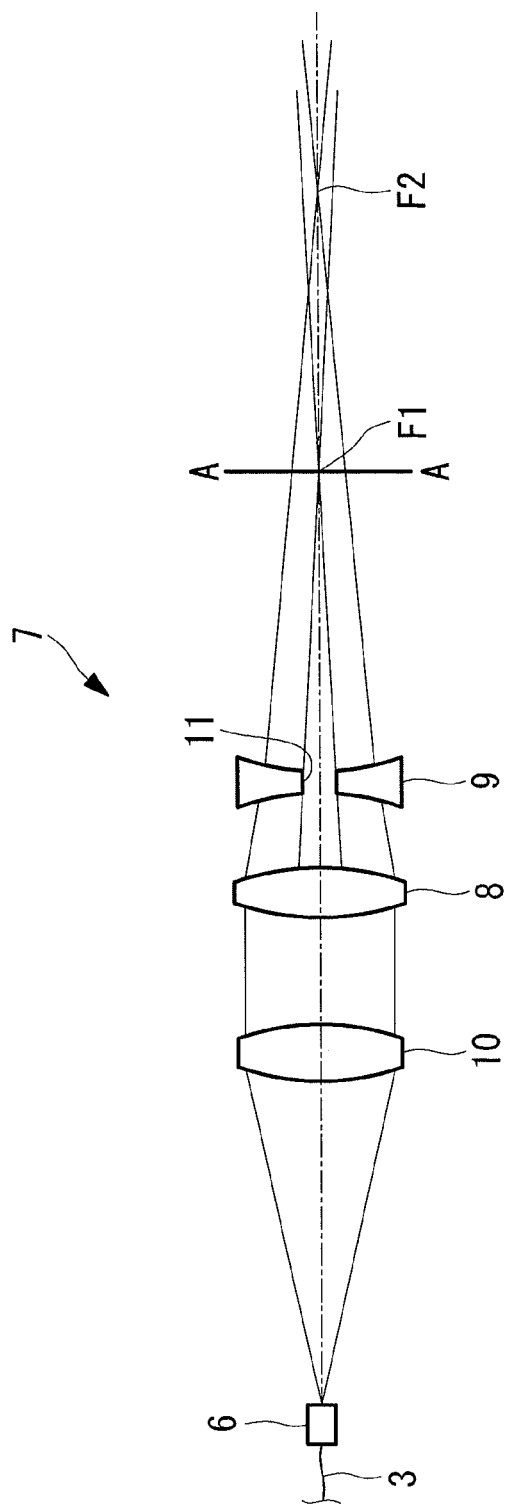
FIG. 2 is a schematic diagram showing an optical system according to the first embodiment of the present invention.

As shown in FIG. 2, the processing head 4 is provided with a laser entrance portion 6, an optical system 7, and so forth. The laser entrance portion 6 is connected to the end of the optical fiber 3 and radiates the laser light transmitted thereto via the optical fiber 3 toward the optical system 7. The optical system 7 is formed of a plurality of lenses and optical components, and focuses the laser light radiated from the laser entrance portion 6. By doing so, it is possible to achieve high enough energy density for cutting the workpiece 20.

As shown in FIG. 1, the processing stage 5 is moved in the plane of a flat surface (X-Y plane) perpendicular to the incident axis of the laser light. The workpiece 20 is placed on the processing stage 5. By doing so, the workpiece 20 can be moved in the X-Y plane relative to the processing head 4. Note that, although a case in which the processing head 4 is fixed will be described in this embodiment, the present invention is not limited to this example. For example, the present invention can be applied to the case in which the workpiece 20 is fixed at one location, and the workpiece 20 is cut by moving the processing head 4.

As described above, with the laser processing apparatus 1 of this embodiment, the laser oscillator 2 generates laser light; the generated laser light passes through the optical fiber 3; and the laser light is radiated from the processing head 4 toward the workpiece 20. When cutting the workpiece 20, the processing stage 5 on which the workpiece 20 is placed is moved in the X-Y plane, and thus, the workpiece 20 is cut in a straight line or in a curved line.

Next, the optical system 7 in the processing head 4 of the laser processing apparatus 1 according to this embodiment will be described with reference to FIG. 2.

The optical system 7 is provided with, for example, convex lenses 8 and 10 and a concave lens 9. The convex lenses 8 and 10 and the concave lens 9 are disposed on the optical axis of the same laser light. In the following, a case in which the convex lens 10, the convex lens 8, and the concave lens 9 are disposed in this order from the side from which the laser light enters will be described. Note that the present invention is not limited to this example, and the convex lens 10, the concave lens 9, and the convex lens 8 may be disposed in this order from the side from which the laser light enters.

The convex lens 10 converts the laser light radiated from the laser entrance portion 6 to collimated light.

The convex lens 8 focuses the laser light that is incident thereon after passing through the convex lens 10. Therefore, the laser light that has passed through the convex lens 8 is focused on the optical axis.

Figure 5:
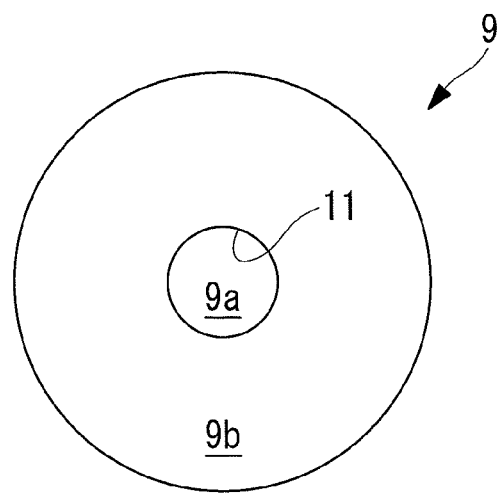
FIG. 5 is a front view showing a concave lens according to the first embodiment of the present invention.

As shown in FIG. 5, the concave lens 9 has a first region 9a in which a through-hole 11 is formed at the center thereof and an annular second region 9b that surrounds the first region 9a.

The first region 9a of the concave lens 9, in other words, the through-hole 11, is positioned on the optical axis, as shown in FIG. 2. Because the through-hole 11 is formed, the first region 9a does not have lens properties. The second region 9b has concave lens properties and diverges the laser light that is incident thereon.

Because the first region 9a of the concave lens 9, which is positioned on the optical axis, does not have lens properties, of the laser light that passes through the concave lens 9, laser light that passes through the first region 9a directly passes therethrough without being focused or diverged. On the other hand, because the second region 9b of the concave lens 9, which surrounds the first region 9a, diverges the laser light, of the laser light that passes through the concave lens 9, laser light that passes through the second region 9b diverges.

By forming the first region 9a in the form of the through-hole 11, which does not have lens properties, it is possible to facilitate the fabrication of the concave lens 9. Specifically, when forming the concave lens 9, the through-hole 11 is provided in an optical material first. Then, the optical material in which the through-hole 11 is provided is formed like a concave lens, and is subsequently polished. At this time, because the through-hole 11 is devoid of material, it is easy to polish the concave curved surface. Therefore, the concave lens 9 of this embodiment can be formed in a simple manner.

By disposing the above-described convex lens 8 and concave lens 9 and radiating the laser light therethrough, two focal points F1 and F2 are formed on the optical axis, as shown in FIG. 2. Specifically, the laser light that has passed through the convex lens 8 and that has subsequently passed through the first region 9a of the concave lens 9, which does not have lens properties, forms a focal point at a point F1 closer to the concave lens 9. In addition, the laser light that has passed through the convex lens 8 and that has subsequently passed through the second region 9b, which has light diverging properties, forms a focal point at a point F2 that is further away from the concave lens 9 than the point F1.

Figure 3:
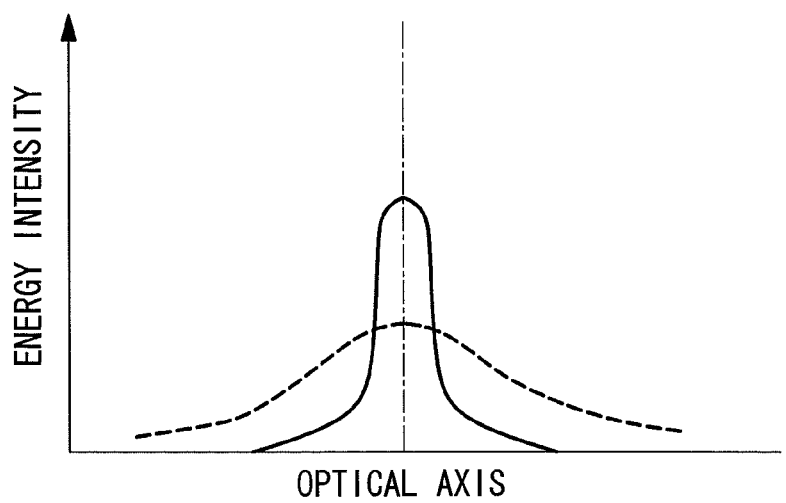
FIG. 3 is a diagram showing the energy intensity distribution of laser light taken across A-A in FIG. 2.
Figure 4:
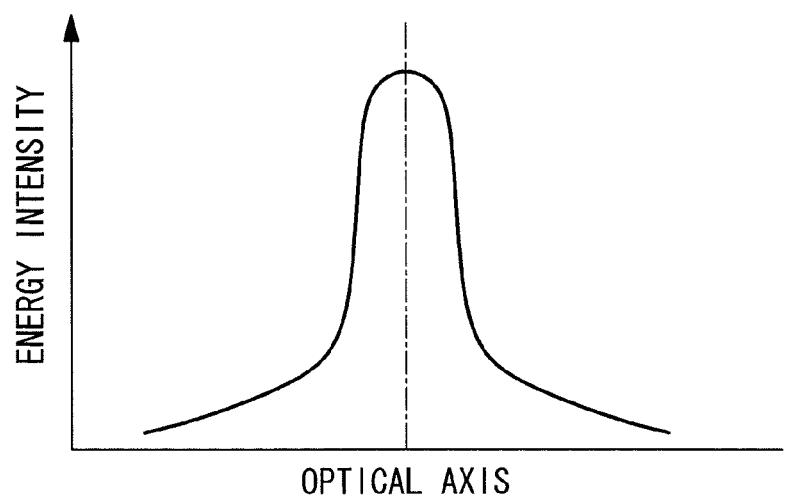
FIG. 4 is a diagram showing the energy intensity distribution, which shows a combined distribution of the energy intensity in FIG. 3.

The light that has been focused by the convex lens 8 and that has also passed through the first region 9a of the concave lens 9 exhibits a high energy intensity on the optical axis, as shown in FIG. 3. On the other hand, because the light that has passed through the second region 9b of the concave lens 9 diverges, the energy intensity thereof is lower as compared with the light that has passed through the first region 9a, as shown in FIG. 3. FIG. 3 is a diagram that separately shows the energy intensity of the light that has passed through the first region 9a and the energy intensity of the light that has passed through the second region 9b, when taken across A-A in FIG. 2. Then, when the energy intensity of the light that has passed through the first region 9a and the energy intensity of the light that has passed through the second region 9b are combined, the result can be represented as in FIG. 4. As shown in FIG. 4, at the focal point F1 of the laser light and in the vicinity thereof, a center portion including the optical axis has a high energy intensity, whereas a peripheral portion has a relatively low energy intensity.

Figure 7:
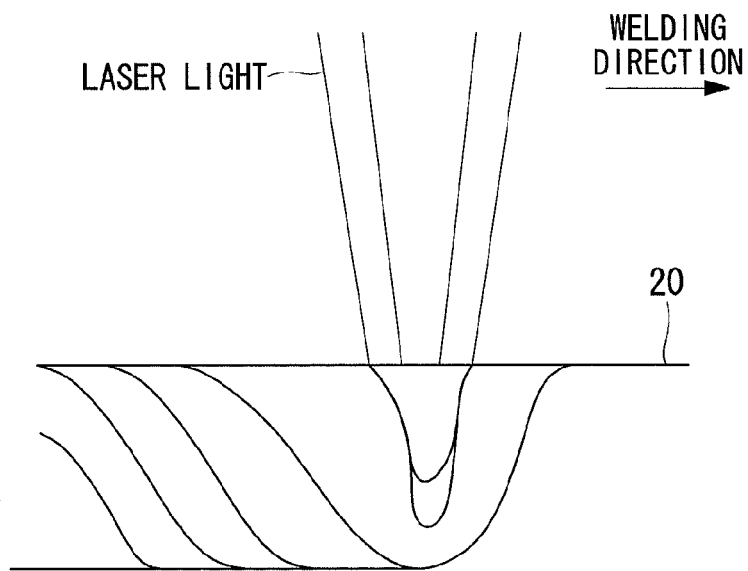
FIG. 7 is a longitudinal sectional view showing a workpiece processed by using the laser processing apparatus according to the first embodiment of the present invention.

Therefore, when a processing point is set at the focal point F1 or in the vicinity thereof, it is possible to perform welding of the workpiece 20 by means of the laser light by utilizing the high energy intensity at the center portion including the optical axis. At this time, because the peripheral portion of the laser light has a low energy intensity relative to the center portion thereof, the evaporation reactive force is reduced there. FIG. 7 is a cross-sectional view of a welded portion in the workpiece 20 during welding, and a keyhole formed by the laser light is also shown. With this embodiment, as compared to the case in which the concave lens 9 is not provided, it is possible to reduce spattering that occurs when the laser light is radiated onto the workpiece 20.

Figure 8:
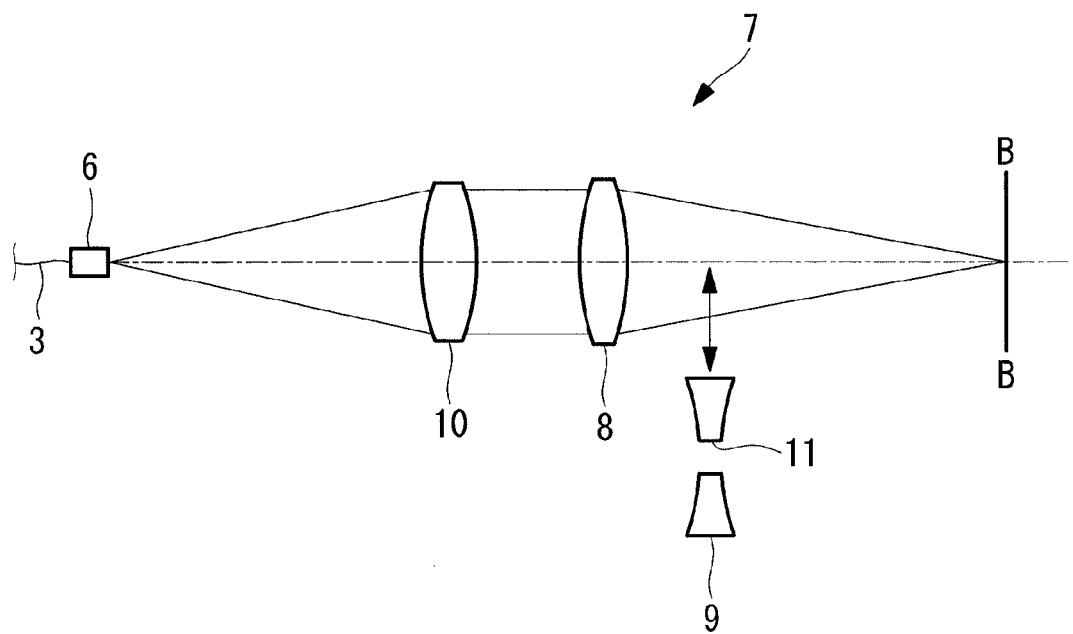
FIG. 8 shows the optical system according to the first embodiment of the present invention in a state in which the concave lens is shifted off the optical path.

Next, switching between an optical system for cutting and an optical system for welding in the optical system 7 according to this embodiment will be described with reference to FIGS. 2 and 8.

The concave lens 9 of the optical system 7 is placed in the optical path and removed therefrom by means of a drive portion (not shown). Specifically, when cutting the workpiece 20, the concave lens 9 is moved out of the optical path of the laser light, as shown in FIG. 8, and, when welding the workpiece 20, the concave lens 9 is placed in the optical path of the laser light, as shown in FIG. 2.

Placement/removal of the concave lens 9 is performed by means of a manual operation by an operator of the laser processing apparatus 1 or by means of an operating program that is stored in advance.

Figure 9:
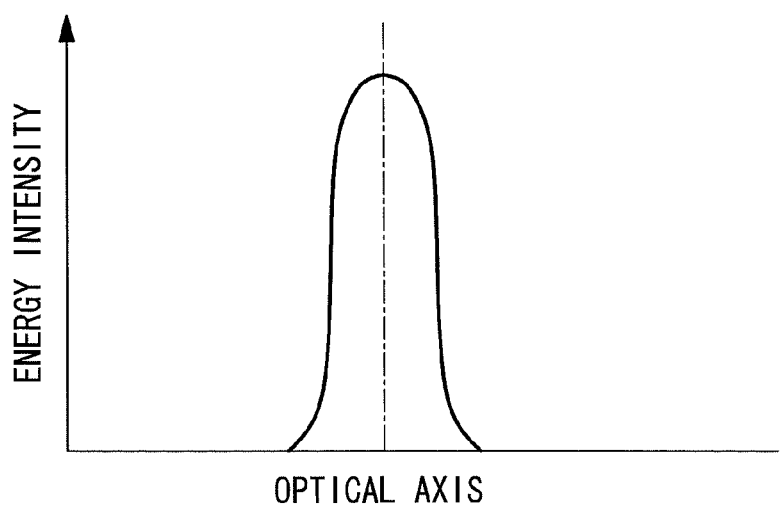
FIG. 9 is a diagram showing the energy intensity distribution of laser light taken along B-B in FIG. 8.

By moving the concave lens 9 out of the optical path of the laser light, the workpiece 20 can be cut by means of the laser light having a high energy intensity by using only the convex lens 8. The light focused by the convex lens 8 exhibits a high energy intensity on the optical axis, as shown in FIG. 9.

In addition, by placing the concave lens 9 in the optical path of the laser light, the convex lens 8 and the concave lens 9 are utilized as described above, and it is possible to perform welding of the workpiece 20 by means of the laser light in which the center portion including the optical axis has a high energy intensity, whereas the peripheral portion has a relatively low energy intensity, as shown in FIG. 4.

Therefore, the apparatus switches between cutting and welding of the workpiece 20 by moving the concave lens 9 out of the optical path of the laser light and by placing it in the optical path. In other words, merely by placing/removing the concave lens 9, it is possible to quickly switch between the cutting optical system and the welding optical system, and thus, for example, it is possible to reduce the time required in a fabrication step in which cutting and welding of the workpiece 20 are both required. Specifically, this is suitable for the case in which cutting and welding of coils are performed in forging equipment and the case in which a tailored blank (TWB: Tailor Welded Blank) is fabricated.

As described above, with this embodiment, by using the concave lens 9 having the through-hole 11, the two focal points can be formed on the optical axis. By producing light having different focusing properties on the optical axis in this way, cutting or welding can be performed by fully utilizing the energy intensity possessed by the laser light at the center portion thereof including the optical axis, and it is also possible to suppress spattering by decreasing the evaporation reactive force because the peripheral portion has a relatively low energy intensity.

By forming the two focal points on the optical axis, the depth of focus is increased as compared with a case in which only one focal point is formed, which stabilizes the keyhole formed in the workpiece 20 when processing it by using the laser light. Accordingly, it is possible to perform cutting or welding in which the stability thereof is maintained.

In addition, if two focal points were to be formed on the optical axis by using only one optical component, the shape thereof would become complex, as with the above-described JP 2006-192503, and thus, the fabrication of the optical component is difficult. In contrast, the shape of the concave lens 9 of this embodiment is such that the through-hole 11 is formed in a concave lens having a general shape, which facilitates the fabrication thereof. In addition, with the optical system 7 of this embodiment, the distance between the two focal points can be adjusted merely by changing the spacing between the convex lens 8 and the concave lens 9.

On the other hand, in the case in which two focal points are formed on the optical axis by using only one optical component, the distance between the two focal points is fixed.

Furthermore, conventionally, when a fiber laser or a YAG laser is used, the area of a portion that the laser light hits during laser welding is small; therefore, when welding is performed by supplying a wire, it is necessary to stringently control the insertion position of the wire, and thus, it is not possible to achieve stable welding. In contrast, with this embodiment, by providing the concave lens 9, the laser light is spread out in the vicinity of the processing point as compared with the case in which the concave lens 9 is not provided. Therefore, the area to which a wire can be supplied is increased as compared with the conventional case, which makes it easy to supply the wire.

Figure 6:
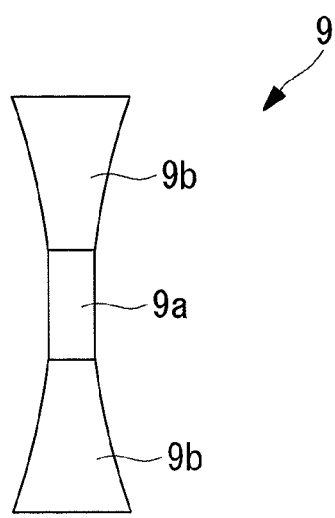
FIG. 6 is a longitudinal sectional view showing a concave lens according to a modification of the first embodiment of the present invention.

Note that, although a case in which the through-hole 11 is formed in the first region 9a has been described in the above-described embodiment, the present invention is not limited to this example. For example, as shown in FIG. 6, the first region 9a may be a flat plate-like shape where a surface through which the laser light enters and a surface through which it is emitted are parallel to each other. In this case, the fabrication of the concave lens 9 is more difficult as compared with the case in which the through-hole 11 is formed in the first region 9a; however, as with the case in which the through-hole 11 is provided, at the focal point of the laser light and in the vicinity thereof, the center portion including the optical axis has a high energy intensity, whereas the peripheral portion has a low energy intensity.

Second Embodiment

In the above-described first embodiment, a case in which two focal points are formed on the optical axis by providing the through-hole 11 at the center portion of the concave lens 9 in the combination of the convex lens 8 and the concave lens 9 has been described; however, the present invention is not limited to this example.

Figure 10:
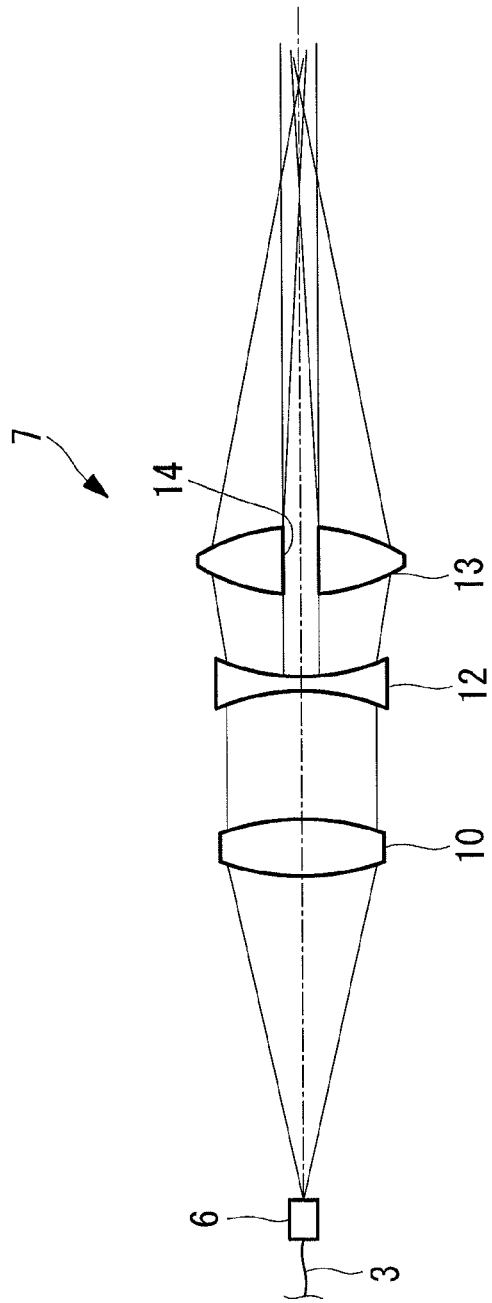
FIG. 10 is a schematic diagram showing an optical system according to a second embodiment of the present invention.
Figure 11:
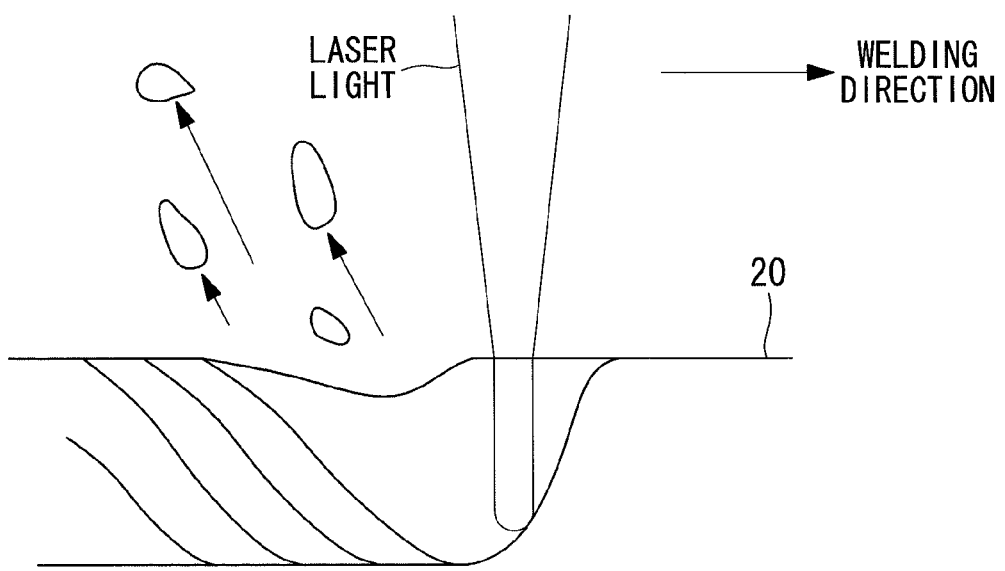
FIG. 11 is a longitudinal sectional view showing a workpiece processed by using a conventional laser processing apparatus.

As shown in FIG. 10, an optical system 7 according to a second embodiment is provided with a concave lens 12 that diverges laser light that is incident thereon and a convex lens 13 in which a through-hole 14 is formed at the center thereof. With FIG. 10, a case in which the convex lens 10, the concave lens 12, and the convex lens 13 are disposed in this order from the side from which the laser light enters will be described; however, the present invention is not limited to this example, and the convex lens 10, the convex lens 13, and the concave lens 12 may be disposed in this order from the side from which the laser light enters.

The convex lens 13 has a third region in which a through-hole 14 is formed at the center thereof and an annular fourth region that surrounds the third region. Note that, as with the above-described first embodiment, a flat plate may be provided in the third region instead of the through-hole 14.

The third region of the convex lens 13 is positioned on the optical axis. Because the through-hole 14 is formed, the third region does not have lens properties. The fourth region focuses the laser light that is incident thereon.

The concave lens 12 and the convex lens 13 are disposed on the same optical axis, and the laser light that passes through the concave lens 12 diverges. In addition, because the third region of the convex lens 13, which is positioned on the optical axis, does not have lens properties, of the laser light that passes through the convex lens 13, laser light that passes through the third region directly passes therethrough without being focused nor diverged. On the other hand, because the fourth region of the convex lens 13, which surrounds the third region, focuses the laser light, of the laser light that passes through the convex lens 13, laser light that passes through the fourth region is focused. Therefore, the light that has been diverged by the concave lens 12 and that has also passed through the fourth region of the convex lens 13 exhibits a relatively high energy intensity on the optical axis. On the other hand, the light that has been diverged by the concave lens 12 and that has also passed through the third region of the convex lens 13 is directly radiated toward the workpiece without being focused.

REFERENCE SIGNS LIST 1 laser processing apparatus
2 laser oscillator
3 optical fiber
4 processing head
5 processing stage
6 laser entrance portion
7 optical system
8 convex lens (first lens)
9 concave lens (second lens)
9a first region
9b second region
10 convex lens
11 through-hole
12 concave lens (third lens)
13 convex lens (fourth lens)
14 through-hole
20 workpiece

The invention claimed is:

1. An optical system comprising:
a laser oscillator that generates laser light and emits the laser light toward the optical system;
a first lens that focuses the laser light which is used for processing a workpiece;
a second lens that is disposed on the same optical axis as the laser light that passes through the first lens and through which the laser light focused by the first lens passes; and
a drive portion that moves the second lens out of the optical path of the laser light when cutting the workpiece and places the second lens in the optical path of the laser light when welding the workpiece,
wherein the second lens has a first region that is positioned on the optical axis and does not have lens properties, as well as a second region that surrounds the first region and diverges the laser light,
wherein the laser light that passes through the second lens is radiated directly to the workpiece,
wherein the first lens and the second lens are disposed so that a focal point of the laser light that has passed through the first region of the second lens is set at a processing point of the workpiece or in a vicinity of the processing point, and
wherein the first region is a plate-like member in which a surface from which the laser light enters and a surface from which the laser light is emitted are parallel to each other.

2. An optical system comprising:
a laser oscillator that generates laser light and emits the laser light toward the optical system;
a third lens that diverges the laser light which is used for processing a workpiece;
a fourth lens that is disposed on the same optical axis as the laser light that passes through the third lens and through which the laser light diverged by the third lens passes; and
a drive portion that moves the fourth lens out of the optical path of the laser light when cutting the workpiece and places the fourth lens in the optical path of the laser light when welding the workpiece,
wherein the fourth lens has a third region that is positioned on the optical axis and that does not have lens properties, as well as a fourth region that surrounds the third region and focuses the laser light,
wherein the laser light that passes through the fourth lens is radiated directly to the workpiece,
wherein the third lens and the fourth lens are disposed so that a focal point of the laser light that has passed through the third region of the fourth lens is set at a processing point of the workpiece or in a vicinity of the processing point, and
wherein the third region is a plate-like member in which a surface from which the laser light enters and a surface from which the laser light exits are parallel to each other.

* * * * *